UNITED STATES PATENT OFFICE.

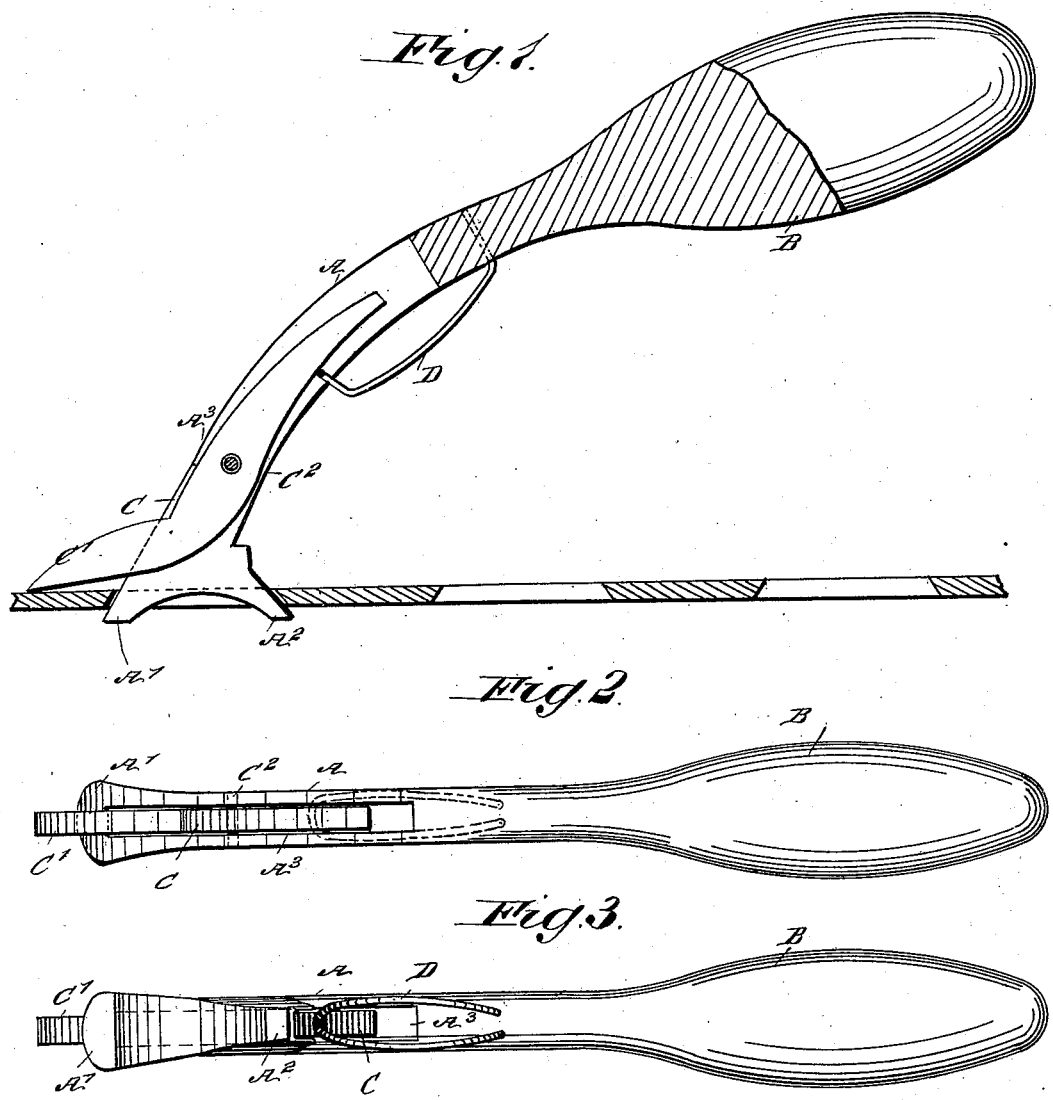

FREDERICK EDWARD ARMSTRONG, OF GENOA, NEW YORK.

LIFTER.

SPECIFICATION forming part of Letters Patent No. 534,490, dated February 19, 1895.

Application filed November 6, 1894. Serial No. 528,058. (No model.)

*To all whom it may concern:*

Be it known that I, FREDERICK EDWARD ARMSTRONG, of Genoa, in the county of Cayuga and State of New York, have invented a new and Improved Lifter, of which the following is a full, clear, and exact description.

The invention relates to stove lifters; and its object is to provide a new and improved lifter more especially designed for conveniently lifting a gridiron from the stove, in whatever position it may be.

The invention consists principally of a handled shank, formed with a fixed jaw, and a spring-pressed lever fulcrumed on the shank and forming with the said fixed jaw, a pair of jaws for holding the gridiron.

The invention also consists of certain parts and details and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a partly sectional side elevation of the improvement as applied. Fig. 2 is a plan view of the device, and Fig. 3 is an inverted plan view of the same.

The improved lifter is provided with a curved shank A, formed at its upper end into a handle B adapted to be taken hold of by the operator. The lower or outer end of the shank A is formed into a fixed jaw A', from which extends rearwardly a lip $A^2$ adapted to engage the beveled wall of the aperture of the gridiron, at the time the jaw A' is passed into the aperture of the gridiron, as indicated in Fig. 1.

The lever C is fitted loosely in a slot $A^3$, formed in the shank A', and the lever is pivoted at $C^2$ and is pressed on at its rear end by a spring D, fastened to the shank.

The jaw A' forms with the front end C' of the lever C, a pair of jaws for securely gripping and holding the gridiron at the wall of the opening, the front end C' of the lifter engaging the top of the gridiron, while the fixed jaw A', engages the beveled wall of the opening.

By the arrangement described, the lifter may be conveniently inserted, by moving the fixed jaw A' into the opening of the gridiron, and engaging the front end of the said jaw with the inclined wall of the opening, at the time the operator presses the shank forward to raise the lever C, and to permit it to engage the front end thereof firmly with the top of the gridiron adjacent to the opening and in front of the jaw A, as is plainly shown in Fig. 1. By this arrangement, the gridiron is firmly gripped and clamped to permit the operator to lift the gridiron from the stove, no matter what its position may be on the stove.

Having thus fully described my invention, I claim as new and desire to secure by Letters Patent—

1. As an improved article of manufacture, a stove lifter, comprising a handle having its lower end enlarged, said enlarged end tapering from the bottom upwardly and adapted to enter an opening in the article to be lifted, and a lever pivoted to the handle and adapted to engage the article adjacent to its aperture, as set forth.

2. As an improved article of manufacture, a stove lifter, comprising a handle having its shank slotted and provided with an enlarged lower end, said enlarged end tapering upwardly, a lever pivoted in the slot of the shank of the handle, and a spring secured to the shank and engaging the lever, as specified.

FREDERICK EDWARD ARMSTRONG.

Witnesses:
LYNN E. KIRTLAND,
WILL. D. NORMAN.